US011619585B2

United States Patent
Landry et al.

(10) Patent No.: US 11,619,585 B2
(45) Date of Patent: Apr. 4, 2023

(54) RAPID AXIAL SCANNING FOR LIGHT SHEET MICROSCOPY USING A PHASED ARRAY

(71) Applicant: The Board of Trustees of the Leland Stanford Junior University, Stanford, CA (US)

(72) Inventors: Joseph R. Landry, Rochester, NY (US); Olav Solgaard, Stanford, CA (US); Stephen S. Hamann, Sunnyvale, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 192 days.

(21) Appl. No.: 16/874,420

(22) Filed: May 14, 2020

(65) Prior Publication Data
US 2020/0371032 A1 Nov. 26, 2020

Related U.S. Application Data

(60) Provisional application No. 62/851,519, filed on May 22, 2019.

(51) Int. Cl.
*G01N 21/64* (2006.01)
*G02B 21/36* (2006.01)
*G02B 21/00* (2006.01)

(52) U.S. Cl.
CPC ..... *G01N 21/6458* (2013.01); *G02B 21/0032* (2013.01); *G02B 21/0088* (2013.01); *G02B 21/365* (2013.01)

(58) Field of Classification Search
CPC ............ G01N 21/6458; G02B 21/0032; G02B 21/0088; G02B 21/365; G02B 21/0076; G02B 21/008; G02B 21/367

(Continued)

(56) References Cited

U.S. PATENT DOCUMENTS

2013/0114123 A1* 5/2013 Bloom ................ G02B 26/105
359/291
2017/0038573 A1* 2/2017 Uhl .................... G02B 21/0044
(Continued)

FOREIGN PATENT DOCUMENTS

CN 104407436 A 3/2015

OTHER PUBLICATIONS

Kevin M. Dean, Philippe Roudot, Erik S. Welf, Gaudenz Danuser, and Reto Fiolka; Deconvolution-free Subcellular Imaging with Axially Swept Light Sheet Microscopy; Jun. 16, 2015, Biophysical Journal; 108(12): 2807-2815 (Year: 2015).*

(Continued)

*Primary Examiner* — Stephone B Allen
*Assistant Examiner* — Rahman Abdur
(74) *Attorney, Agent, or Firm* — Lumen Patent Firm

(57) ABSTRACT

An axially swept light sheet fluorescence microscope has illumination optics capable scanning the focus region of a line beam along an illumination optical axis to illuminate a light sheet in a sample plane, and detection optics capable of collecting fluorescence light from the sample plane and imaging the collected light on a light detector with a rolling shutter. A microcontroller synchronizes the rolling shutter with the scanning of the focus region. The illumination optics performs the axial scanning using a linear phased array of independently controllable electrostatically driven optical elements controlled by the microcontroller.

8 Claims, 9 Drawing Sheets

(58) Field of Classification Search
USPC .......................................................... 359/385
See application file for complete search history.

(56) References Cited

U.S. PATENT DOCUMENTS

| | | | |
|---|---|---|---|
| 2018/0088305 A1 | 3/2018 | Itoh | |
| 2018/0088308 A1* | 3/2018 | Liu | G02B 21/367 |
| 2018/0299664 A1* | 10/2018 | Payne | G01S 7/4813 |
| 2018/0321479 A1 | 11/2018 | Landry | |
| 2019/0346668 A1* | 11/2019 | Han | G02B 21/0076 |
| 2020/0041865 A1 | 2/2020 | Hamann | |

OTHER PUBLICATIONS

Selective Plane Illumination Microscopy with a Light Sheet of Uniform Thickness Formed by an Electrically Tunable Lens Microscopy Research and Technique 00:00-00 (2016).

Uniform and scalable light-sheets generated by extended focusing Kevin M. Dean and Reto Fiolka* Oct. 20, 2014 | vol. 22, No. 21 | DOI:10.1364/OE.22.026141 | Optics Express 26141.

Ryosuke Itoh, et al., "Light sheet fluorescence microscopy using high-speed structured and pivoting illumination," Opt. Lett. 41, 5015-5018 (2016).

Tunable structured illumination light sheet microscopy for background rejection and imaging depth in minimally processed tissues, Journal of biomedical optics, 24(4) (2019).

Hamann, et al., (May 2017). "Random access optical scanning using a MEMS phased array." In Lasers and Electro-Optics (CLEO), 2017 Conference on (pp. 1-2). IEEE.

Hamann, et al. (Jul. 2018). "Variable Focusing and Steering Using High Speed MEMS Phased Array." In 2018 International Conference on Optical MEMS and Nanophotonics (OMN) (pp. 1-2). IEEE.

Hamann, et al. (2018). "High-speed random access optical scanning using a linear MEMS phased array." Optics letters, 43(21), 5455-5458.

Gao, "Extend the field of view of selective plan illumination microscopy by tiling the excitation light sheet," Optics express 23(5), 6102-6111 (2015).

Chmielewski, et al., "Fast imaging of live organisms with sculpted light sheets," Scientific reports 5, 9385 (2015).

Fu, et al., "Imaging multicellular specimens with real-time optimized tiling light-sheet selective plane illumination microscopy," Nature communications 7, 11088 (2016).

Ping, et al., "Propagating-path uniformly scanned light sheet excitation microscopy for isotropic volumetric imaging of large specimens," Journal of biomedical optics 24(8), 086501 (2019).

Solgaard, et al., "Deformable grating optical modulator," Optics letters 17(9), 688-690 (1992).

* cited by examiner

RAPID AXIAL SCANNING FOR LIGHT SHEET MICROSCOPY USING A PHASED ARRAY

CROSS-REFERENCE TO RELATED APPLICATIONS

This application claims priority from U.S. Provisional Patent Application 62/851,519 filed May 22, 2019, which is incorporated herein by reference.

STATEMENT REGARDING FEDERALLY SPONSORED RESEARCH OR DEVELOPMENT

None.

FIELD OF THE INVENTION

The present invention relates generally to light sheet fluorescence microscopy. More specifically, it relates to devices and methods for axially swept light sheet fluorescence microscopy.

BACKGROUND OF THE INVENTION

Light sheet fluorescence microscopy (LSFM) has become a valuable 3D imaging tool for biological scientists due to its high throughput and favorable photobleaching rates. These two properties make LSFM an attractive alternative to confocal and two-photon microscopy for long-term 3D imaging of transparent and semi-transparent specimens, such as cleared tissue or developing embryos. Although LSFM excels at volumetric imaging, traditional Gaussian beam-based light sheet systems commonly have poor axial resolution due to the trade-off between light sheet uniformity and thickness due to the nature of the Gaussian beam.

Many techniques address this tradeoff by constructing the light sheet from non-Gaussian beam profiles. Scanned Bessel beams and optical lattices produce uniform sheets over the sample field-of-view with narrow central lobes. However, these techniques result in side lobes, producing significant out of focus blurring which require 3D deconvolution to recover the resolution and prolongs recovery of the final image. Other techniques capture multiple image volumes from different views. The views are used to reconstruct the final image volume in post-processing with the most detailed information from each view. While effective, these methods can reduce imaging speed, require significantly more data storage, and do not provide real-time imaging.

Deconvolution-free sub-micron isotropic resolution can be achieved using axially swept light sheet fluorescence microscopy (ASLM). In ASLM, a narrow, uniform light sheet is produced by scanning a tightly focused Gaussian beam along the illumination optical axis and suppressing the out of focus regions. Original ASLM methods fused the in-focus regions of a series of images with different light sheet foci to produce an overall in-focus image. More recent implementations have synchronized a continuously moving beam to the rolling shutter of an sCMOS camera, allowing the shutter to reject the out of focus light. These techniques have been demonstrated using piezo reference mirrors, electrically tunable lenses, and voice-coil stages. All of these methods require large mechanical movements with low speed that cannot match the speed of the camera. Further, these techniques do not scale well into faster frame rates, such as those available at reduced camera areas of interest, as each pass of the scanning element imposes significant downtime.

BRIEF SUMMARY OF THE INVENTION

A light sheet microscopy device is disclosed which uses a phased array called a grating light valve (GLV) to scan the focus of a high numerical aperture line beam along the illumination optical axis of the light sheet microscope. The GLV is a 1D spatial light modulator that manipulates the phase of a 1D (line) beam. In the Fourier plane of the line beam, the GLV displays a wrapping, parabolic phase profile which acts as a weak focusing element capable of changing the nominal focus of the illumination objective. By scanning the focus of the beam in this way, a very thin light sheet is created. In axial scanning, the linear phased array is used as a varifocal cylindrical lens.

In contrast with electrically tunable lenses, the grating light valve has a large aperture, no duty cycle, and can keep the beam aberration free over a large sample FOV. Furthermore, the speed of the axial scan is effectively constant, resulting in an equal power distribution along the optical axis.

This approach to axial scanning can perform a lateral and axial scan simultaneously, which can be used for rapid volumetric, high resolution imaging without the need to move the sample. The approach enables axial beam scanning along the illumination axis (x axis) by modulating the focus of the illumination objective using cylindrical phase profiles on the linear phased array. Because this focus is a line (along y), this scans out a 2D plane in XY. At any moment in time during the scan, the line focus, which is the narrowest region of the beam, is synchronized to the center of the rolling shutter (the length of which is along Y) of a camera, which captures the image focused by the detection axis (z). The net effect of this scanning is that the camera only ever captures fluorescence from the narrowest part of the beam. Consequently, the axial resolution of the system is significantly increased. Using this technique with a high-speed phase modulator, the beam scan is always able to keep up with the camera (i.e., the system is camera limited), and isotropic resolution (equal resolution in X, Y, Z) is possible by making the focus narrow enough.

In one aspect, the invention provide an axially swept light sheet fluorescence microscope comprising: a laser capable of producing a light beam; illumination optics capable of forming from the light beam a line beam focused in a focus region and scanning the focus region of the line beam along an illumination optical axis to illuminate a light sheet in a sample plane; a light detector with a rolling shutter; detection optics capable of collecting fluorescence light from the sample plane and imaging the collected light on the light detector; a microcontroller capable of sending control signals to the illumination optics and to the light detector to synchronize the rolling shutter with the scanning of the focus region; wherein the illumination optics comprise a linear phased array of independently controllable electrostatically driven optical elements; wherein the linear phased array is capable of being controlled by the microcontroller to display a series of phase patterns to produce translation of the focus region of the line beam along the illumination optical axis. The linear phased array may also be capable of being controlled by the microcontroller to display a series of phase patterns to produce translation of the focus region of the line beam both along the illumination optical axis and in a lateral direction to the illumination optical axis.

The linear phased array is preferably positioned conjugate to a rear pupil plane of an illumination objective lens in the illumination optics. The a linear phased array may be implemented, for example, using a linear MEMS phased array. The independently controllable electrostatically driven optical elements may be reflective elements (e.g., composed of aluminum-coated silicon nitride) or transmissive elements (e.g., composed of liquid crystal on silicon).

DETAILED DESCRIPTION OF THE INVENTION

Embodiments of the invention provide an axially-swept light sheet fluorescence microscope using a linear phased array for high-speed cylindrical lensing. The narrow focus of the light sheet is synchronized to the rolling shutter of a sCMOS camera. In one implementation, the microscope provides isotropic resolution down to 720±55 nm in all three spatial dimensions. With an update rate of 2.85 µs, the phased array tracks the camera sensor rolling shutter at camera-limited rates. The device is capable of imaging speeds of 140 frames per second at sub-micron isotropic resolution. The random-access nature of the scanning technique enables collection of all frames in the same readout direction, forward or backward, rather than alternating the readout to maximize speed. The device uses a linear phased array with an update rate of 350 kHz. The maximum update rate of the scanning (2.85 µs) is faster than the update rate of the camera rolling shutter (9.6 µs), which ensures the camera frame rate is matched at full-frame and any smaller area of interest. As a random access device, the scan can be performed in the same direction for each frame acquisition with no speed penalty, which is important for maintaining even temporal sampling for pixels in time-lapses.

When using Gaussian beams to form the light sheet in conventional LSFM, the beam width is ordinarily chosen such that the confocal range $x_c$, defined as twice the Rayleigh range, is at least equal to the field-of-view in the object plane. To create a uniform sheet at wavelength λ, the beam waist $w_0$ is chosen such that $$w_0 \geq (x_c \lambda/2\pi)^{1/2}. \quad \text{(Eq. 1)}$$

This resulting beam width is usually several times larger than the width required for the axial resolution to approach the lateral resolution. With ASLM, the light is focused tightly, resulting in a confocal region that is uniform over a small fraction of the field-of-view at any given time. By axially scanning the focus of this beam at the center of the camera's rolling shutter an effective light sheet which is both uniform and narrow is produced. The width of the shutter is set to $Mx_c$, where M is the system magnification, to reject the out of focus light.

Figure 1A:
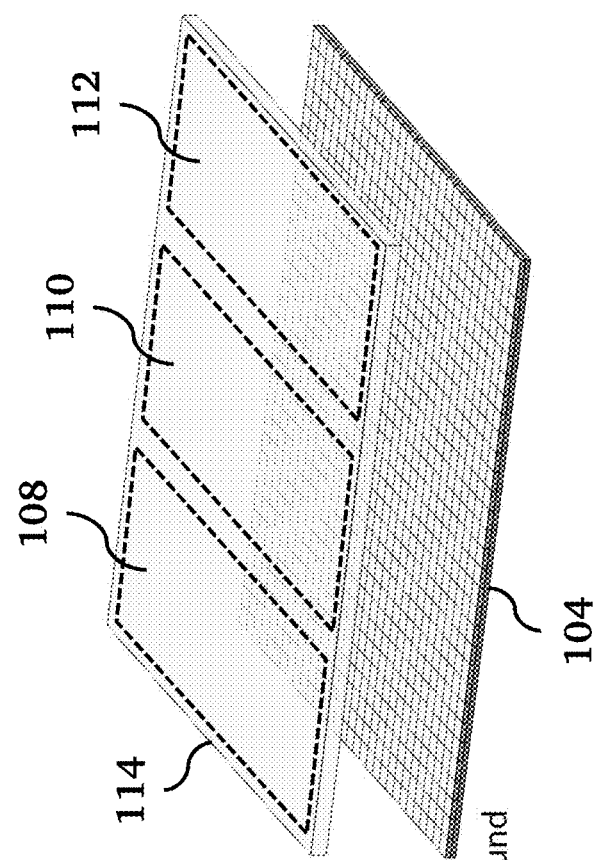
FIG. 1A and FIG. 1B are perspective views of a line beam focus region and resulting light sheet, respectively, illustrating axial scanning and rolling shutter synchronization according to an embodiment of the invention.
Figure 1B:
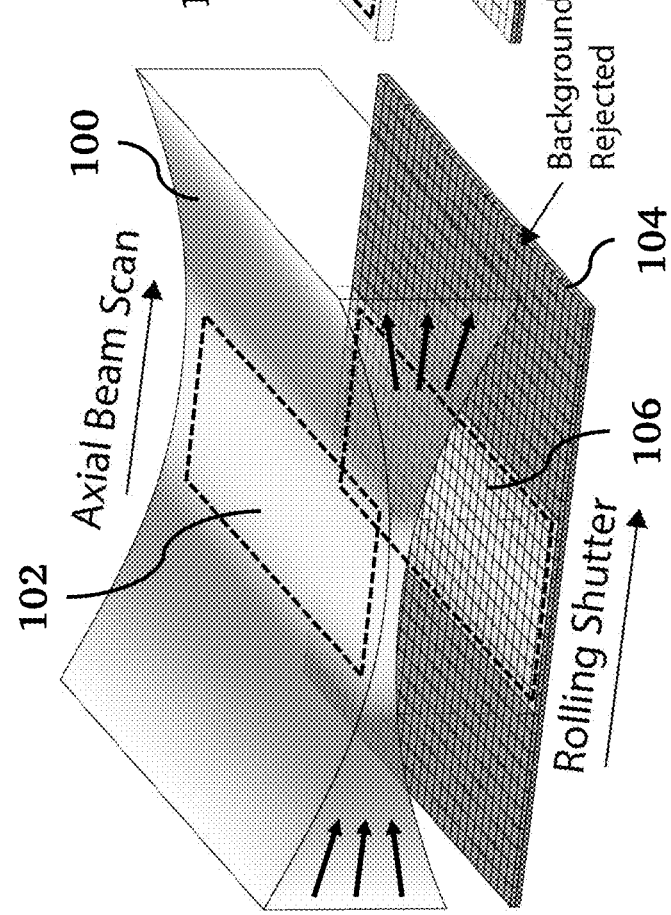

FIG. 1A and FIG. 1B illustrate axial scanning and rolling shutter synchronization according to an embodiment of the invention. A line beam 100 propagating in an axial direction in a sample plane is focused in a focus region 102 that is imaged by light detector 104 in an image plane with a rolling shutter 106. The focus region 102 of the line beam is scanned axially along an illumination optical axis at various positions 108, 110, 112 to illuminate a light sheet 114 in the sample plane. FIG. 1A shows the position of the focus region and rolling shutter at one point in time during the camera acquisition in which a ten-pixel rolling shutter is synchronized to the axial scan of a Gaussian beam tightly focused in one dimension. FIG. 1B shows the thin light sheet resulting from only imaging the tightly focused region during the scan, and rejecting of out-of-focus light.

Figure 2A:
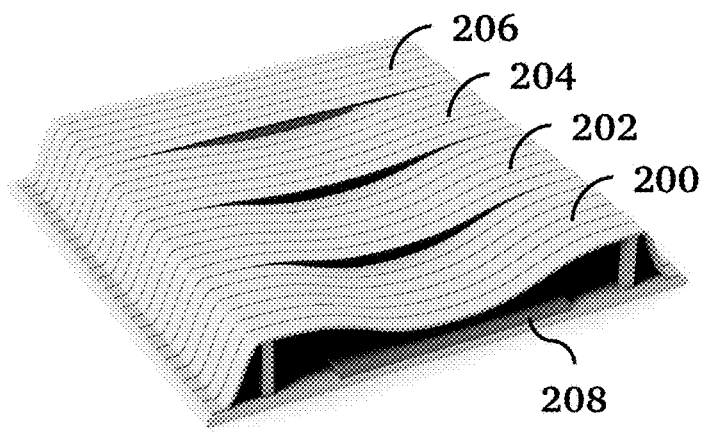
FIG. 2A is an isometric view showing four elements in a phased array according to an embodiment of the invention.
Figure 2B:
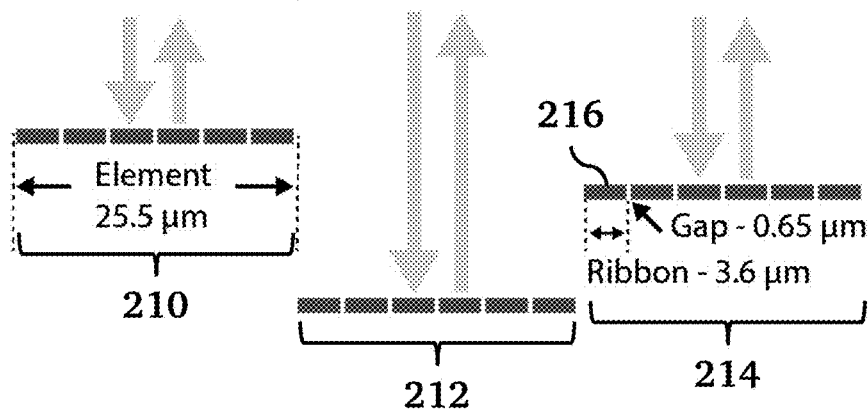
FIG. 2B is a cross sectional view along the long axis of three elements of a phased array according to an embodiment of the invention.

In embodiments of the present invention, the axial beam scanning is performed using a linear phased array, for example, a reflective, linear MEMS phased array made up of hundreds or thousands of electrostatically driven optical elements. FIG. 2A is an isometric view showing four of the 1,088 elements in one implementation of such a phased array. The figure shows three elements 200, 202, 204 actively deflecting toward the common electrode 208 and one element 206 undeflected. FIG. 2B is a cross sectional view along the long axis of the phased array showing three elements 210, 212, 214, each composed of six ribbons (e.g., ribbon 216 of element 214) that actuate together. In this implementation, each of the elements is 25.5 µm wide. Each element is composed of six aluminum-coated silicon nitride ($Si_3N_4$) ribbons. Each ribbon is 3.6 µm wide with a 0.65 µm gap between them. Each element is individually controllable and capable of deflecting up to 250 nm with 10-bit precision, providing fine phase control from 0 to $2\pi$ round-trip phase shift for wavelengths as long as 500 nm. At normal incidence, the phased modulation provided by an element is given by $2d/\lambda$ waves, where d is the element displacement and $\lambda$ is the wavelength. The phased array is random access, meaning that the entire state of the phased array is switchable in the time it takes to change a single element: 2.85 µs, or 350 kHz. The speed of the phased array is electronically limited, and can in principle operate in the MHz.

Figure 2C:
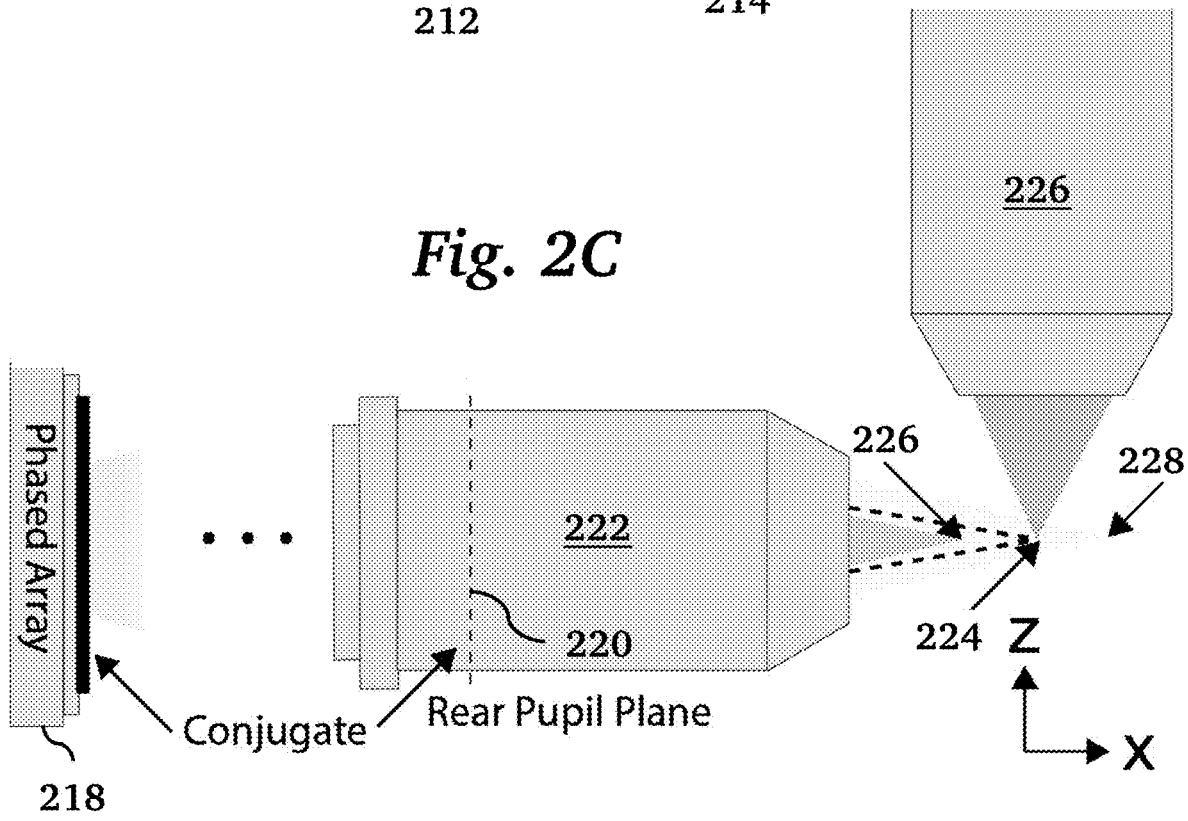
FIG. 2C is a cross-sectional schematic diagram of a portion of a light sheet microscope in which a phased array is used to produce axial scanning according to an embodiment of the invention.

As illustrated in FIG. 2C the phased array 218 in one implementation is positioned conjugate to the rear pupil plane 220 of the illumination objective 222 and displaying phase patterns with different effective lens powers in series. Displaying positive or negative phase curvatures results in translation of the line beam focus about a bias point 224 in the sample plane, e.g., to positions 226 and 228. The detection optics 226 are focused in the sample plane. The phase profile $\phi_c$ for a desired focal length f is given by $\phi_c(p,f)=(2\pi/\lambda)(f-(f^2+p^2)^{1/2})$ when $f>0$, $\phi_c(p,f)=(2\pi/\lambda)(f+(f^2+p^2)^{1/2})$ when $f<0$, (Eq. 2)

where p is the transverse element position on the phased array relative to the optical axis. The change in focal position is given by $\Delta z = -n f_{IO}^2/(f_{IO}+f_{PA}-u)$, (Eq. 3)

where $f_{IO}$ and $f_{PA}$ are the focal lengths of the illumination objective and phased array, u is the distance between them, and n is the immersion refractive index. With a well-aligned system, u becomes equal to $P_{IO}$, and Eq. 3 becomes linear with phased array lens power $-n f_{IO}^2 P_{PA}$. To first order, the illumination numerical aperture (NA) of the scanned beam in this configuration is independent of phased array power. As long as the system aperture is large enough to accommodate the change in beam size caused by the phased array, the beam waist of the scanned line beam remains the same throughout the scan.

The discrete states of the phased array are perfectly suited for synchronization with the camera rolling shutter as the rolling shutter itself advances in discrete jumps at fixed intervals. For optimal spatial overlap, each change in shutter position should be followed by an update of the phased array in order to position the beam at the new center of the shutter. In this implementation, the fastest line rate of the implementation of the sCMOS camera is 9.6 µs, which sets the maximum rate at which the shutter advances. Thus, the phased array, which updates as fast as 2.85 µs, can readily keep up. Because the phased array can jump between any two arbitrary states, there is no duty cycle caused by a fixed reset period, nor is it required to alternate the scan directions with each frame to preserve speed. Importantly, this random access nature also means there is no distinction between operating the camera at 50 Hz in full-frame or hundreds of Hz at smaller camera sensor regions of interest; all are camera-limited.

Due to the discrete, flat-phase elements that make up the array, the greater the slope of $\phi_c(p, f)$ in Eq. 2, the greater the phase deviation will be over each element. The maximum diffraction-limited NA supported by the phased array is 0.008, which corresponds to a wave front RMS error of 0.07 waves at 488 nm. After this NA, the light efficiency into the scanned focus drops significantly as light is redirected into higher orders.

Figure 3:
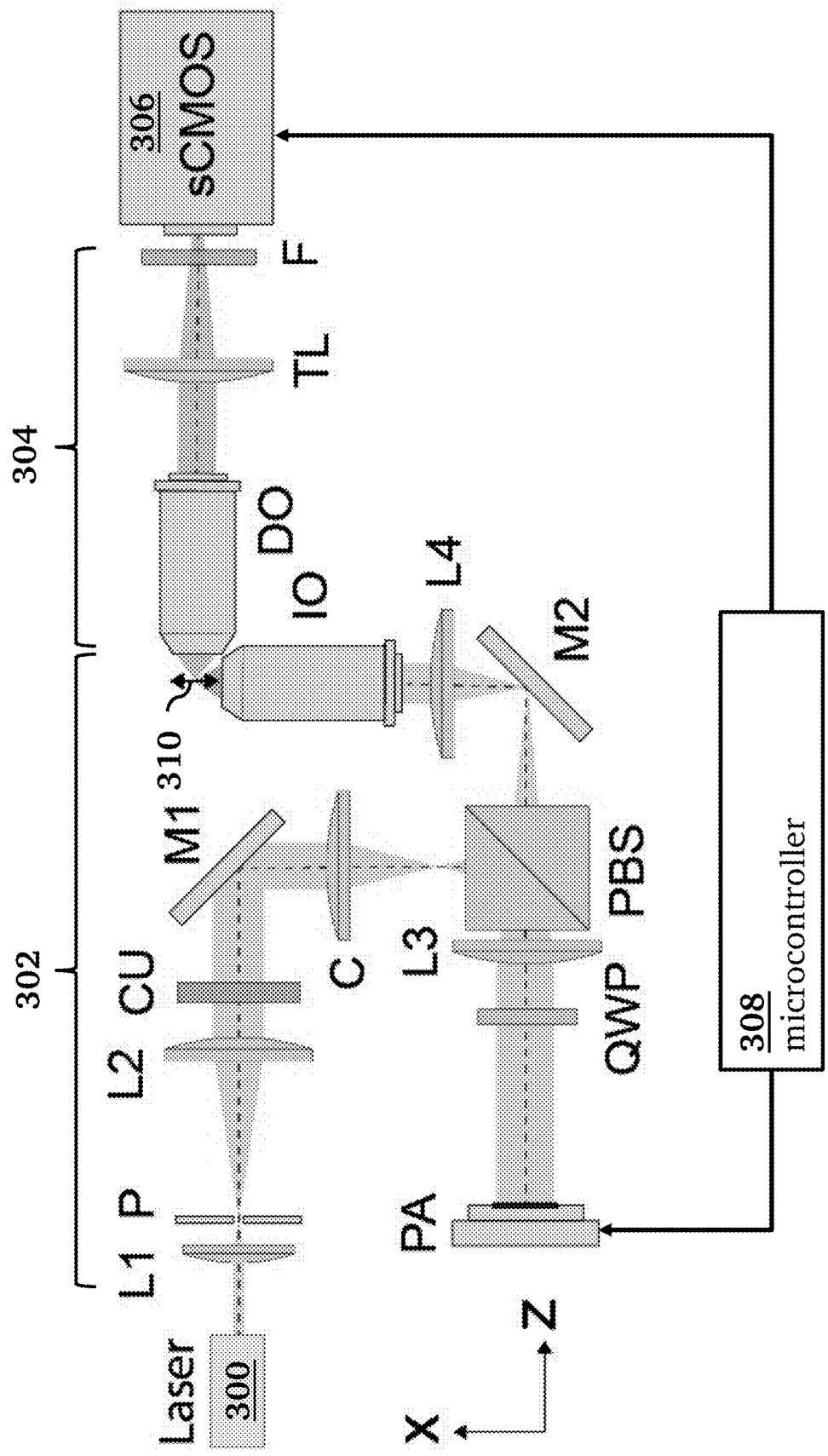
FIG. 3 is a cross-sectional schematic illustration of one implementation of an axially swept light sheet fluorescence microscope according to an embodiment of the invention.

An illustration of one implementation of an axially swept light sheet fluorescence microscope according to an embodiment of the invention is shown in FIG. 3. The device includes a laser 300 capable of producing a light beam, illumination optics 302 capable of forming from the light beam a line beam focused in a focus region and scanning the focus region of the line beam along an illumination optical axis 310 to illuminate a light sheet in a sample plane; a light detector 306 with a rolling shutter; detection optics 304 capable of collecting fluorescence light from the sample plane and imaging the collected light on the light detector; and a microcontroller 308 capable of sending control signals to the illumination optics and to the light detector to synchronize the rolling shutter with the scanning of the focus region.

In this particular implementation the laser 300 is a 488 nm laser (TOPTICA iBEAM smart, 0.41 mm $1/e^2$ radius, vertical linear polarization). The light beam from the laser enters the illumination optics 302 where it is expanded 10.8× by lens L1 (7.4 mm) and lens L2 (80 mm) and spatially filtered by a 12.5 µm pinhole P (Edmund Optics, 38-539). The beam passes through cleanup filter CU (Semrock, FF01-488/10-25) and is reflected by a mirror M1 toward cylindrical lens C (100 mm), which focuses the beam into a vertical line. A polarizing beam splitter PBS reflects the vertically polarized beam, after which it is focused by lens L3 (100 mm) and is circularly polarized by quarter wave plate QWP. The beam is then incident on the horizontally oriented phased array PA (F1088-P with COSMO development board, Silicon Light Machines) with width 4.5 mm $1/e^2$ radius along the length of the phased array. The linear phased array includes independently controllable electrostatically driven optical elements and is capable of being controlled by the microcontroller (Teensy 3.6 USB development board) to display a series of phase patterns to produce translation of the focus region of the line beam along the illumination optical axis.

After reflection from phased array PA, the phase modulated beam passes through QWP and L3 again, now passing through PBS with horizontal polarization. After reflecting off mirror M2 and passing through lens L4 (80 mm), the beam, with collimated dimension 3.6 $1/e^2$ radius, enters the final element of the illumination optics, the illumination objective IO (Olympus UMPlanFL 20×0.5 NA) resulting in an illumination numerical aperture (NA) of 0.37 $1/e^2$. The resulting line beam is then focused in a focus region in the sample plane.

Fluorescence in the sample plane is imaged by detection optics 304 onto sCMOS detector 306. Specifically, the fluorescence collected by detection objective DO (Olympus UMPlanFL 20×0.5 NA) passes through tube lens TL (Thorlabs TTL180-A), long-pass filter F (Semrock BLP01-488R-25), and forms an image on the sCMOS camera 306 (Zyla 4.2 PLUS), with its rolling shutter oriented vertically. Both IO and DO water immersion objectives are fixed in an aluminum chamber which holds the specimen. Lenses L1-L4 are achromatic doublet lenses.

Timing synchronization between the phase modulator and camera is handled by a microcontroller 308 (Teensy 3.6), which acts as a master to the camera 306 and phased array PA. The transistor-transistor logic (TTL) input to the phased array triggers a predefined display update sequence, called a frame. The microcontroller provides simultaneous triggers to the frame input of the camera and phased arrays, initiating a single-frame free-run of the phased array states and camera rows, which are set to change at the same rate. The maximum frame rate at the full area of interest is 50 frames per second.

Spatial synchronization is ensured by calibration of the phased array sequence to match the camera's known shutter position sequence for a given area of interest. This is performed by choosing three different lens powers on the phased array, recording the row on the camera corresponding to the beam waist, and fitting to Eq. 3 to derive the required lens power to position the beam to any specific camera row.

Figure 4B:
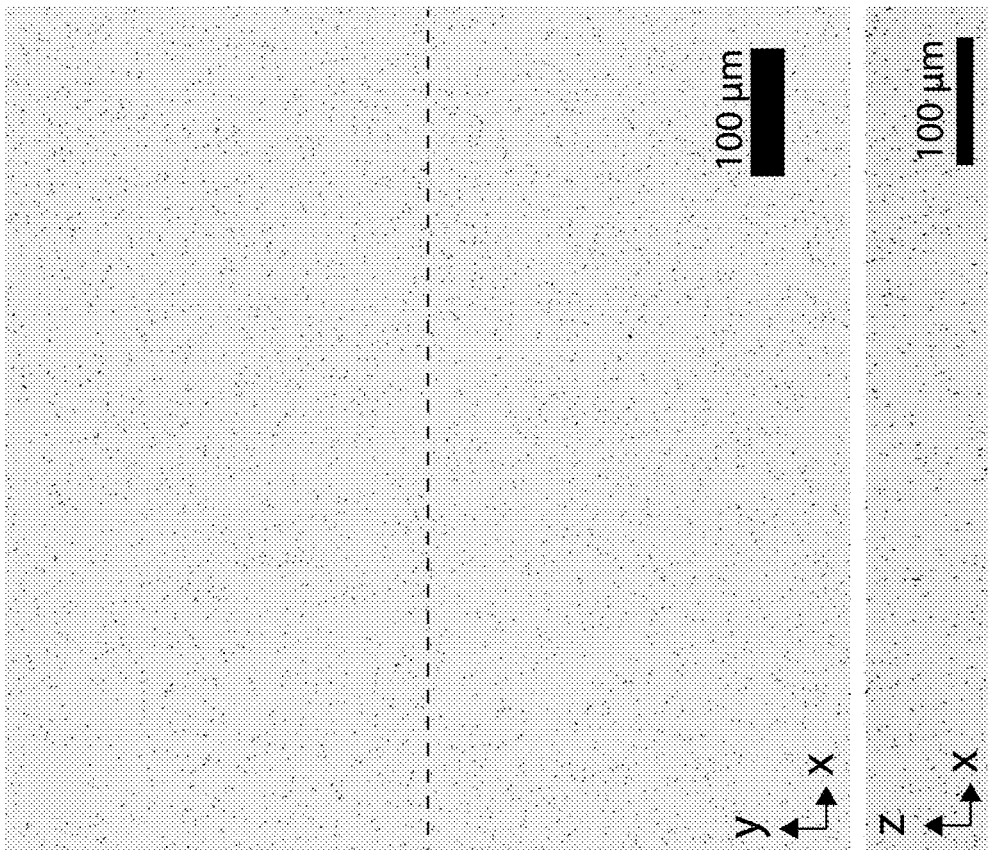
FIG. 4B is an inverted image after synchronization of rolling shutter and beam focus showing a uniformly illuminated light sheet according to an embodiment of the invention.
Figure 4A:
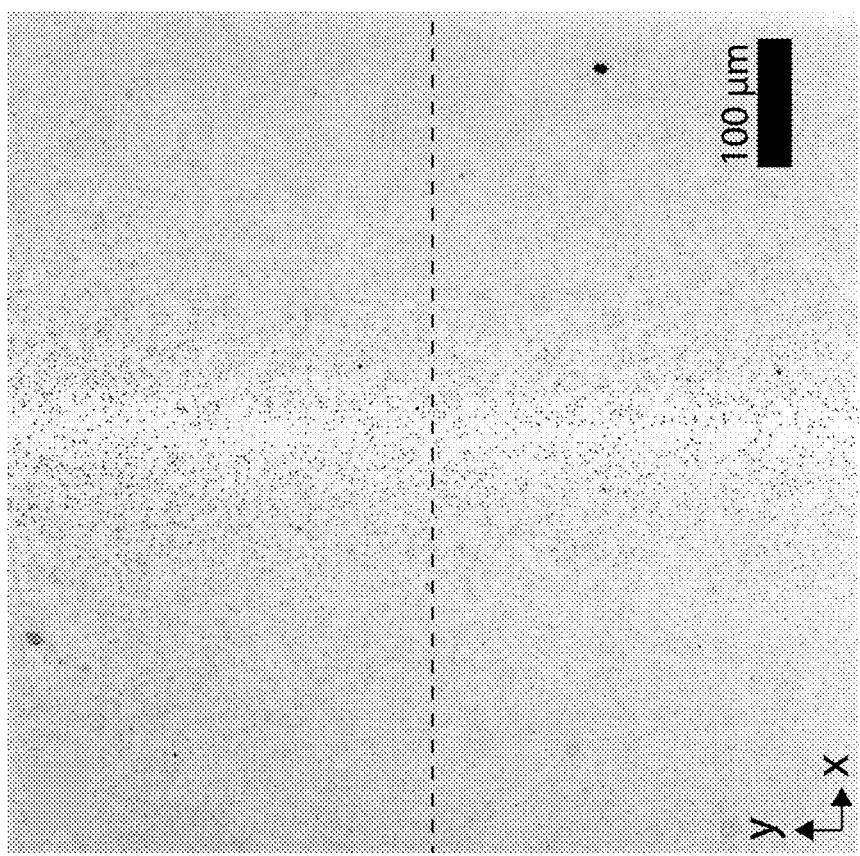
FIG. 4A is an inverted image of the nominal focus of a light sheet produced with the phased array off according to an embodiment of the invention.

In an example experiment illustrating the operation of the microscope, an agarose suspension of yellow-green 200 nm fluorescent beads (ThermoFisher F8811) was prepared to evaluate the spatial synchronization of the beam with the rolling shutter of the camera. FIG. 4A is an inverted image of the nominal focus of the light sheet with the phased array off, i.e., in a quiescent (mirror-like) state. In this state, the beam converges to form a tight focus in image center. FIG. 4B is an inverted image after synchronization of rolling shutter and beam focus. Synchronization of the focus to the rolling shutter resulted in the illumination of out-of-focus light and sharp beads across the field of view.

Figure 4C:
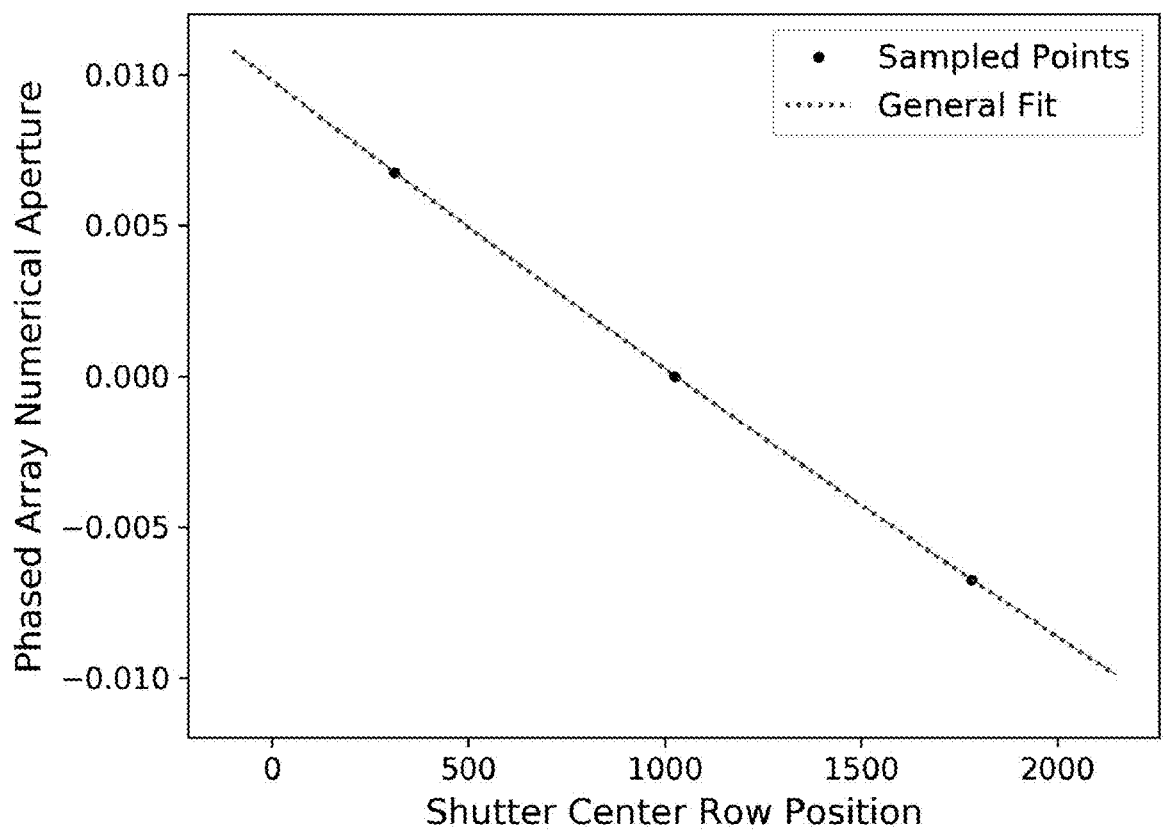
FIG. 4C is a graph of phased array numerical aperture vs. shutter center row position according to an embodiment of the invention.

Synchronization was achieved by fitting Eq. 3 using the waist positions recorded for lens powers of −1.5, 0, and 1.5 diopters with pixel rows 310, 1025, and 1780. This calibration maps each row location to the necessary phased array lens power required to focus at that location, as shown in the graph of FIG. 4C.

Figure 4D:
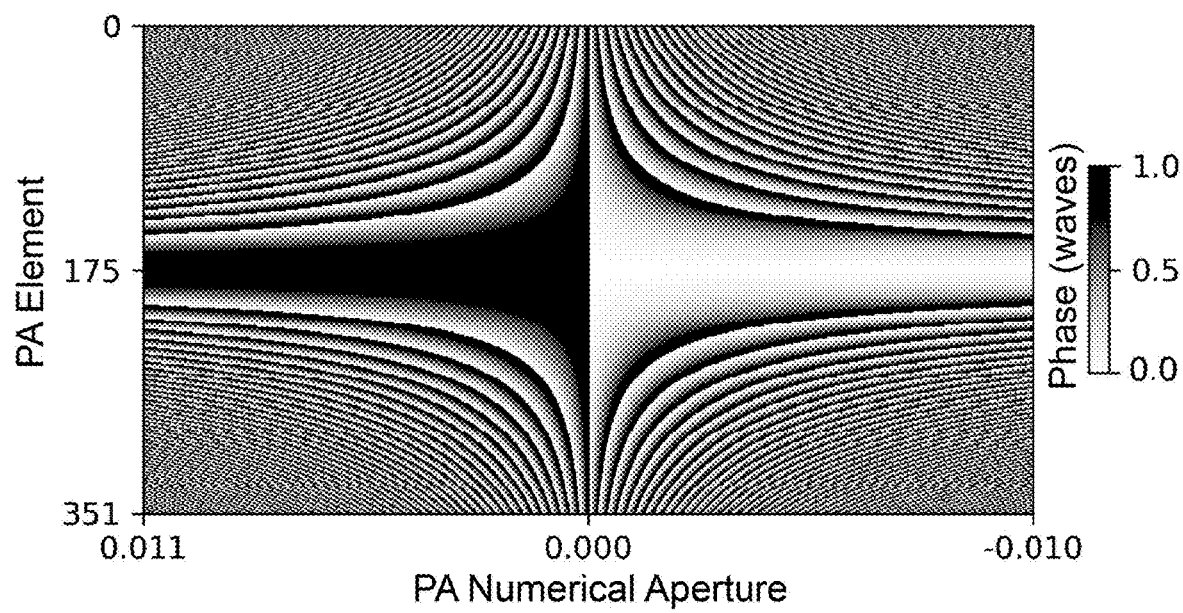
FIG. 4D is a graph of phase array element vs. numerical aperture according to an embodiment of the invention.

The known shutter positions are used to populate the corresponding lens power display sequence on the phased array to track the rolling shutter, as shown in the graph of FIG. 4D. This figure shows the sequence of approximately 2,048 lookup tables generated by the fit which track the rolling shutter as it advances across the shutter. Each column is a single state of the phased array, which updates at the same rate as the camera shutter.

Figures 5A, 5B, 5C:
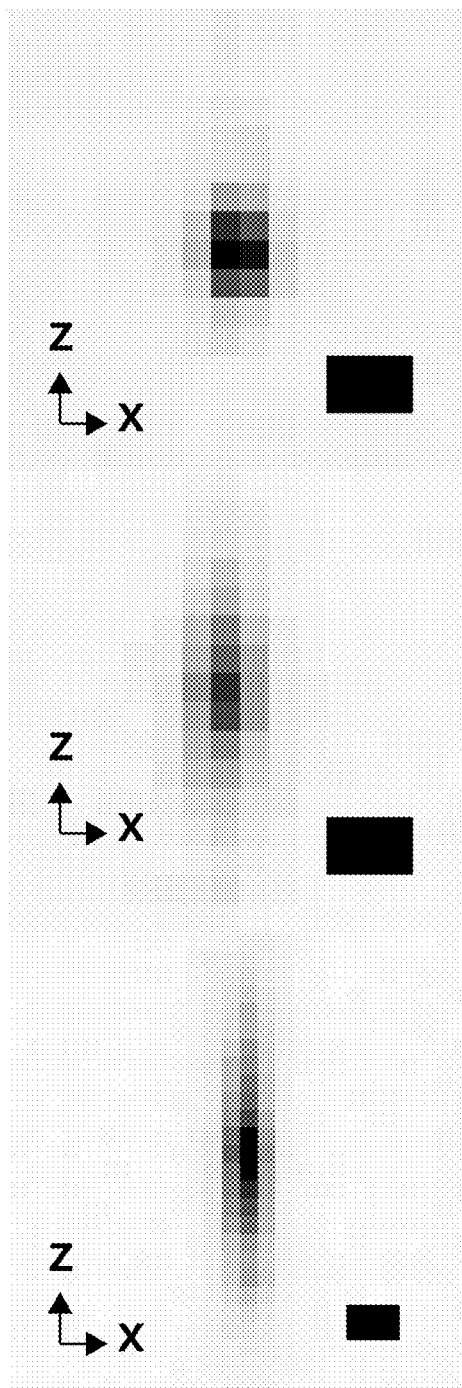
FIGS. 5A, 5B, 5C show, respectively, inverted axial PSFs at the center of the field of view (FOV) with shutter widths of 65, 325, and 1625 µm according to an embodiment of the invention.

The same agarose bead suspension was used to characterize the lateral and axial microscope resolution as a function of rolling shutter width. Three-dimensional images are captured by stage scanning the bead suspension through the synchronized beam scan, which acquires the 3D PSF. The lateral FWHM, which is independent of slit width, is 504 nm±17 across the field of view. Inverted axial PSFs at the center of the field of view (FOV) with shutter widths of 65, 325, and 1625 µm are shown in FIGS. 5A, 5B, 5C, respectively. Scale bars are 1 µm.

Figure 5D:
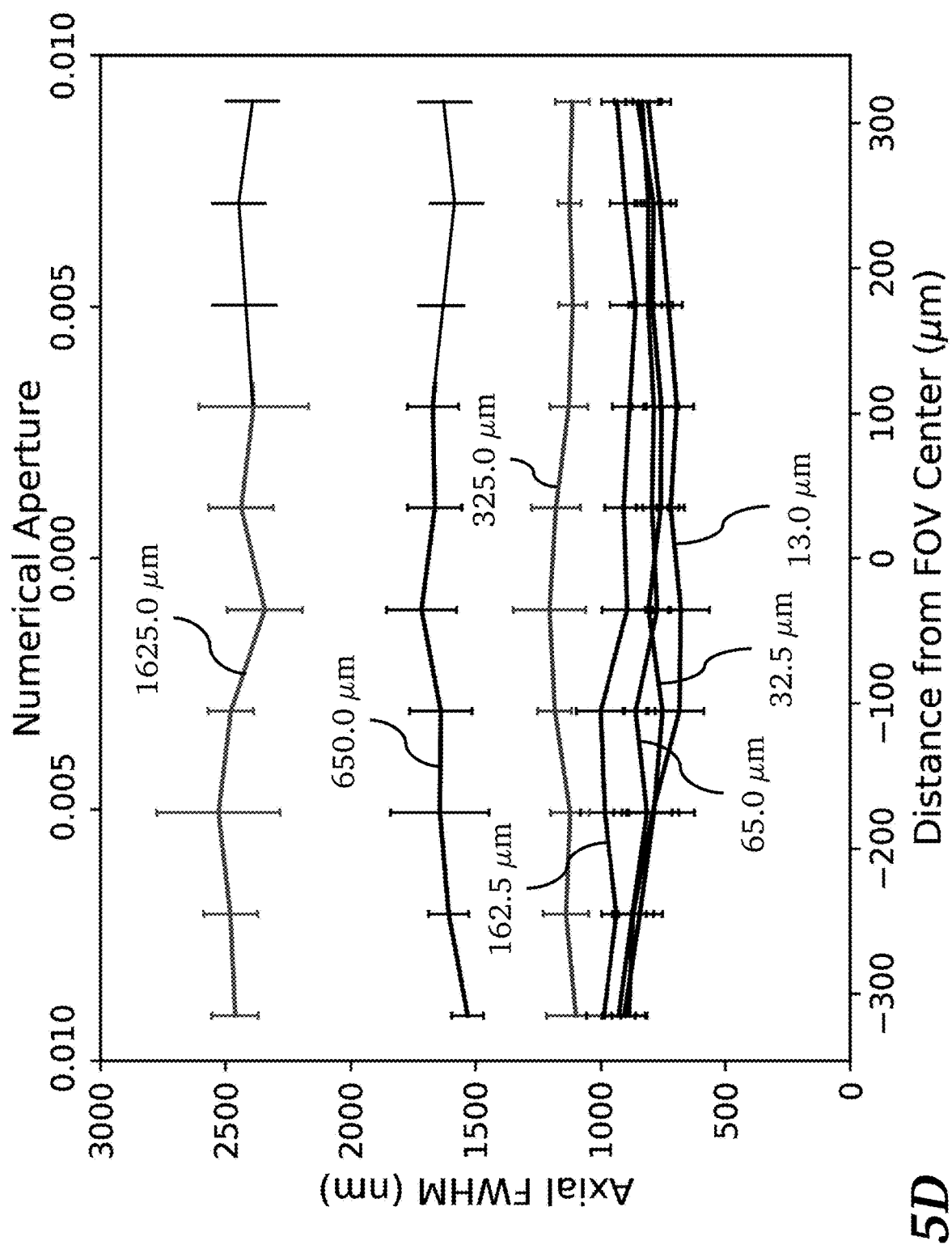
FIG. 5D is a graph showing axial FWHM variation along the optical axis with various shutter widths and at different distances from the nominal focus at the FOV center according to an embodiment of the invention.

FIG. 5D is a graph showing axial FWHM variation along the optical axis with various shutter widths and at different distances from the nominal focus at the FOV center. The beads are grouped based on location into bins, each of which spans one-tenth of the FOV. At the center of the field-of-view with a two-pixel shutter width, the FWHM is 720±55 nm and it gradually increases to 885±65 nm and 807±90 nm at the left and right edges, respectively. The deterioration of resolution was expected as the maximum phased array NA required shift the beam focus from the center to edge, 0.010, is greater than the 0.008 value for diffraction-limited performance.

As an example, we demonstrated the microscope on an approximately 8 hour old GFP-labeled Drosophila embryo. Based on the system characterization, we chose a rolling shutter width of 65 µm, which sacrifices a small amount of resolution in the center for five times more signal compared to the two-pixel shutter. To demonstrate the increased resolution, we compared 3D images acquired using a 65 µm shutter to that of a 1625 µm shutter case, which results in a FWHM similar to conventional LSFM systems using a static light sheet.

Figure 6A:
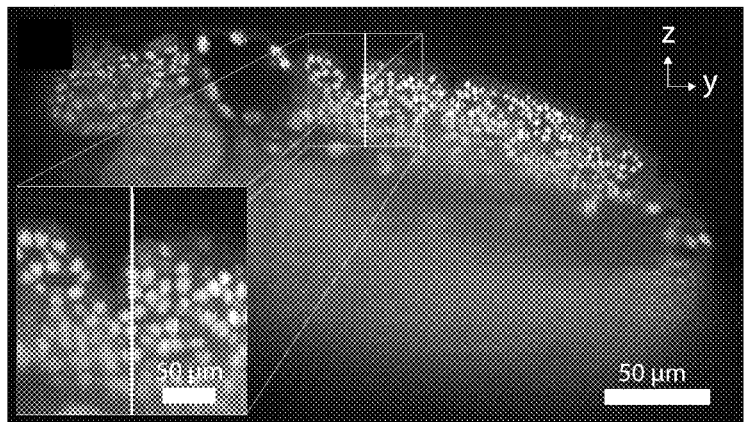
FIGS. 6A-6B are two images of a *Drosophila* embryo captured using a rolling shutter width of 65 and 1625 µm, respectively, according to an embodiment of the invention.
Figure 6B:
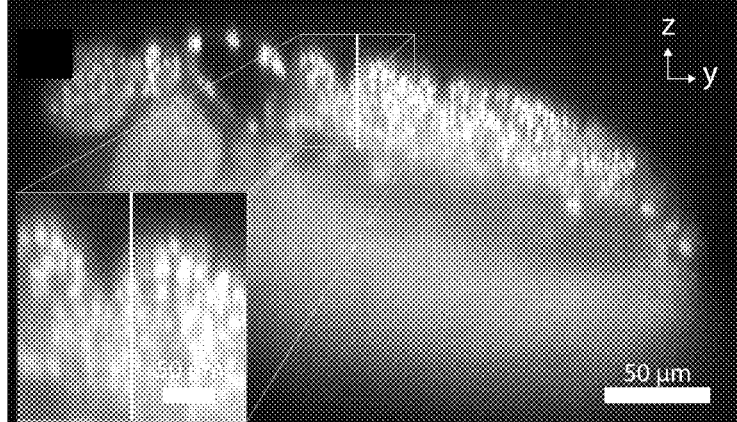
Figure 6D:
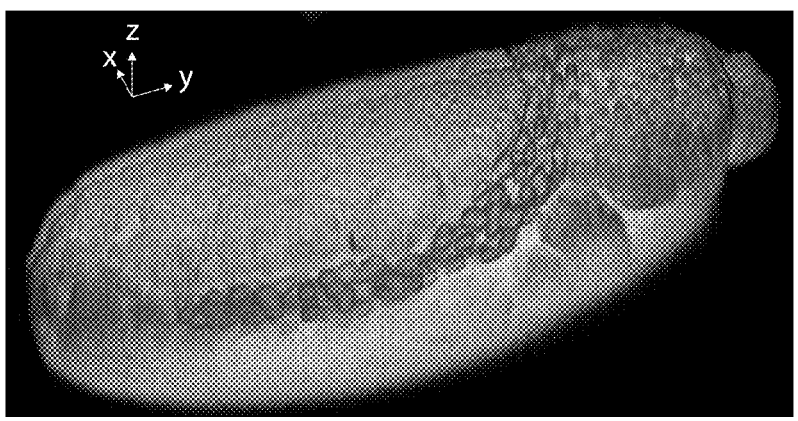
FIGS. 6D-6E are 3D images of a *Drosophila* embryo showing the surface of the reconstructed 3D volumes with rolling shutter widths of 65 and 1625 µm, respectively, according to an embodiment of the invention.
Figure 6E:
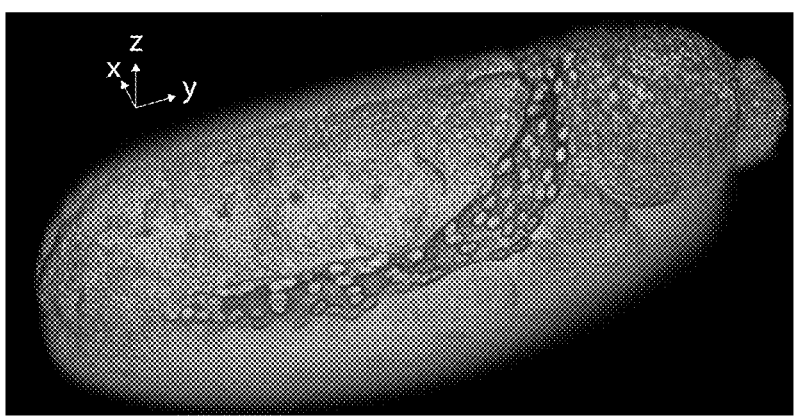
Figure 6C:
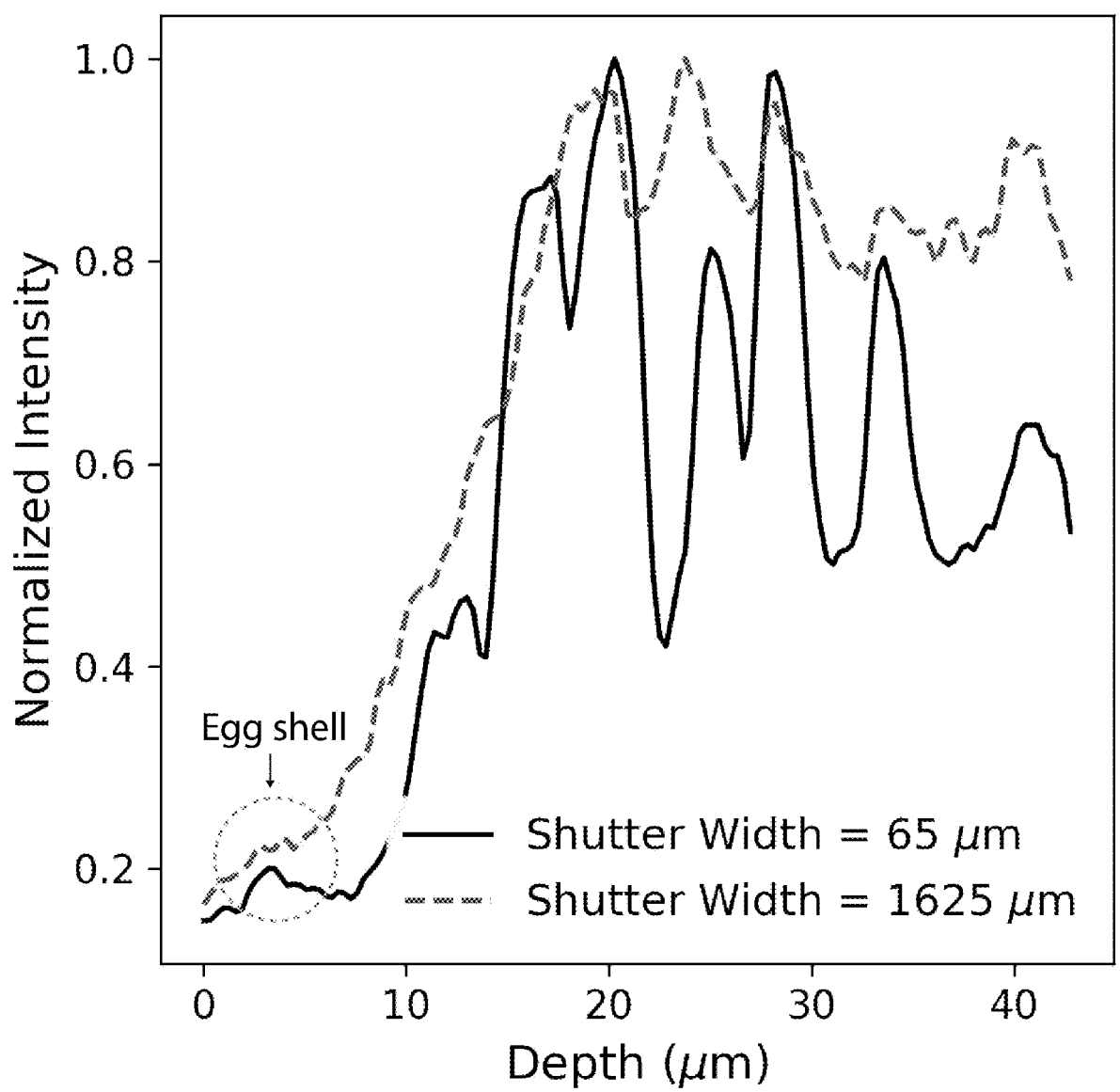
FIG. 6C is a graph of the normalized intensity at different depths in the sample for two different rolling shutter widths according to an embodiment of the invention.

FIGS. 6A-6B illustrate a comparison of images of an 8-hour old GFP-labeled Drosophila embryo captured at low and high axial resolutions. Each of FIG. 6A and FIG. 6B shows a YZ section from a 3D Drosophila image using a rolling shutter width of 65 and 1625 µm, respectively. The line profile through the first 45 µm of the sample along z clearly shows the resolution increase; deeper imaging was limited by scattering in the specimen and could benefit from multiple views. A graph of the normalized intensity profile from the surface to the 45 µm of the sample is shown in FIG. 6C.

With the increased axial resolution, it is possible to distinguish the thin egg shell of the sample in the proximity of other structures. In FIGS. 6D-6E the same specimen is shown in 3D, which enables visualization of the Drosophila embryo surface in great detail. FIGS. 6D-6E show the surface of the reconstructed 3D volumes with rolling shutter widths of 65 and 1625 µm, respectively.

To demonstrate this technique at increased frame rates, we reduced the camera area of interest and acquired a rapid 3D image sequence for a 14 hr. old GFP-labeled Drosophila embryo. The acquisition runs at 140 frames per second using a 688×1400 pixel area of interest, with each pixel exposure lasting 96 µs. The short exposure time combined with the low power to reduce photobleaching resulted in a moderately noisy 3D acquisition, which highlights the inherent tradeoffs associated with this technique. The short pixel exposure means that relatively high powers are often needed to be used to achieve adequate SNR levels in these conditions.

Sub-micron isotropic resolution has been demonstrated using a phased array to perform an axial scan in synchronization with the rolling shutter of a modern sCMOS camera. The technique achieves sub-micron isotropic resolution in real time and utilizes a fixed readout direction without compromising on speed for cameras with readout rates as fast as 2.85 µs. The scanning is straightforward to calibrate and lends itself to automation.

This light sheet microscope is best suited for specimens with robust fluorophores or those requiring a single 3D scan, such as cleared tissue. In these applications the effects of photobleaching can be neglected and high laser powers can be used to achieve adequate SNR while continuing to operate with high axial resolution at maximal frame rates. Faster sCMOS cameras have recently become available from Hamamatsu with row readout rates as low as 4.9 µs. Even with this camera, which operates twice as fast as the one used in our demonstration, our phased array device would still operate fast enough for camera-limited performance up to 100 full frames per second.

For higher fluorescence collection efficiency, the rolling shutter width can be increased at the expense of axial resolution. This performance trade-off could be mitigated by adjusting the light sheet confocal range such that it matches the larger shutter width to ensure the collected light remains in focus, which would offer improved performance. The confocal range in the sample plane is directly dependent on the beam width at the rear pupil plane, which is conjugate to the phased array. Because the phased array can be used as a virtual shutter to truncate the beam, it can be used to control the confocal range without changes to the optical layout. Adjustment to the beam width is achieved by operating the regions on the phased array outside the target width as gratings, which deflect the light into higher orders which are subsequently filtered.

In addition to using a cylindrical phase profile, a phase ramp can be added to the phased array which will cause the XY plane scanned to translate along Z. In this way, 3D scans may be acquired by synchronizing the depth-of-field of the detection objective to the newly selected XY plane along Z, all while maintaining isotropic resolution and speed.

Embodiments of the invention may also involve a lateral scanning technique. Instead of scanning a focus along X with the cylindrical phase, the phase modulator can be rotated 90 degrees for lateral beam scanning (e.g. Bessel beam) along Y (parallel to X), and also synchronize with the rolling shutter. In many sCMOS cameras, there are actually two rolling shutters (one for each half) but it has not previously been possible to move a line fast enough between the shutters before they move to the next row (e.g. every 5 µs). As such, uses of slit synchronization in conventional light sheet microscopy is limited to half of the throughput of the camera. In contrast, with this phased array, which updates every 3 µs and can randomly access different lines with the beam, it is possible to address both shutters before they proceed to the next row to increase the overall speed by a factor of two.

In the embodiments of the invention described above, the independently controllable electrostatically driven optical elements are optically reflective elements. However, embodiments may instead use optically transmissive elements. For example, the transmissive elements may be composed of liquid crystal on silicon. With a transmissive phased array, QWP and PBS will no longer be necessary in the illumination optics. The beam paths between PA and PBS would no longer be folded; as a result, an additional lens may be used on one of the unfolded beam paths since L3 can only be used once. No other modifications to the device would be necessary.

Devices according to embodiments of the present invention may be used for any wavelength typically used for fluorescence microscopy, i.e., approximately 300-1000 nm. The specific embodiments described above support 2π phase modulation for wavelengths up to 500 nm, however, the technique also works reasonably well for longer wavelengths. Reflective phased arrays capable of larger deflections may be used to extend the range to longer wavelengths to enable detection of common fluorophores excited at 532, 640, 785 nm.

In the phase modulator described in embodiments above, the use of six ribbons per element is an example only. In fact, it is preferable to have fewer ribbons per element than six, and most preferable to have a single ribbon per element. In general, smaller element sizes enables the use of higher magnification (and higher NA) objective lenses. Preferably, elements 4 µm in size is ideal to image the entire field of view with up to 100× objectives, while 40 µm size elements restricts the field of view to about 10× objectives.

The invention claimed is:

1. An axially swept light sheet fluorescence microscope comprising:
   a) a laser configured to produce a light beam;
   b) illumination optics configured to form from the light beam a line beam focused in a focus region and configured to scan the focus region of the line beam along an illumination optical axis to illuminate a light sheet in a sample plane;
   c) a light detector with a rolling shutter;
   d) detection optics configured to collect fluorescence light from the sample plane and imaging the collected light on the light detector; wherein a detection optical axis of the detection optics is orthogonal in the focus region to the illumination optical axis;
   e) a microcontroller configured to send control signals to the illumination optics and to the light detector to synchronize the rolling shutter with the scanning of the focus region;
   wherein the illumination optics comprise a linear phased array of independently controllable electrostatically driven optical elements;
   wherein the linear phased array is configured to be controlled by the microcontroller to display a series of phase patterns to produce translation of the focus region of the line beam along the illumination optical axis.

2. The axially swept light sheet fluorescence microscope of claim 1 wherein the linear phased array is a linear MEMS phased array.

3. The axially swept light sheet fluorescence microscope of claim 1 wherein the independently controllable electrostatically driven optical elements are reflective elements.

4. The axially swept light sheet fluorescence microscope of claim 3 wherein the independently controllable electrostatically driven optical elements are composed of aluminum-coated silicon nitride.

5. The axially swept light sheet fluorescence microscope of claim 1 wherein the independently controllable electrostatically driven optical elements are transmissive elements.

6. The axially swept light sheet fluorescence microscope of claim 5 wherein the independently controllable electrostatically driven optical elements are composed of liquid crystal on silicon.

7. The axially swept light sheet fluorescence microscope of claim 1 wherein the linear phased array is positioned conjugate to a rear pupil plane of an illumination objective lens in the illumination optics.

8. The axially swept light sheet fluorescence microscope of claim 1 wherein the linear phased array is further configured to be controlled by the microcontroller to display a series of phase patterns to produce translation of the focus region of the line beam both along the illumination optical axis and in a lateral direction to the illumination optical axis.

* * * * *